United States Patent [19]
Grannes

[11] Patent Number: 5,519,793
[45] Date of Patent: May 21, 1996

[54] APPARATUS AND METHOD FOR COMPUTER VISION MEASUREMENTS

[75] Inventor: Steven G. Grannes, St. Paul, Minn.

[73] Assignee: The United States of America as represented by the Secretary of the Interior, Washington, D.C.

[21] Appl. No.: 971,642

[22] Filed: Nov. 5, 1992

[51] Int. Cl.[6] ............................................. G06T 5/20
[52] U.S. Cl. ................................. 382/266; 382/199
[58] Field of Search .......................... 382/22, 21, 26, 382/27, 28, 48, 199, 266, 197, 204, 205, 206, 283, 173, 9

[56] References Cited

U.S. PATENT DOCUMENTS

| | | | |
|---|---|---|---|
| 3,805,035 | 4/1974 | Serre | 382/28 |
| 3,936,800 | 2/1976 | Ejiri et al. | 382/27 |
| 4,121,294 | 10/1978 | Galanis et al. | 364/571 |
| 4,377,340 | 3/1983 | Green et al. | 356/237 |
| 4,660,086 | 4/1987 | Lemelson | 358/105 |
| 4,661,985 | 4/1987 | Akutsu | 382/28 |
| 4,817,184 | 3/1989 | Thomason et al. | 382/8 |
| 4,916,640 | 4/1990 | Gasperi et al. | 382/48 |
| 4,958,374 | 9/1990 | Tokita et al. | 382/22 |
| 5,023,714 | 6/1991 | Lemelson | 358/107 |
| 5,027,422 | 6/1991 | Peregrim et al. | 382/22 |
| 5,050,227 | 9/1991 | Furusawa et al. | 382/22 |
| 5,068,908 | 11/1991 | Inoue et al. | 382/22 |
| 5,212,740 | 5/1993 | Paek et al. | 382/22 |
| 5,289,373 | 2/1994 | Zarge et al. | 382/6 |

OTHER PUBLICATIONS

Young et al. "Handbook of Pattern Rec and Image Processing", Academic Press, 1986, pp. 216–223.
Gonzalez et al. "Digital Image Processing", Addison–Wesley 1992, pp. 414–429.
Levine, *Vision in Man and Machine*, McGraw–Hill, 1985, pp. 176–188.

Primary Examiner—Michael T. Razavi
Assistant Examiner—Jon Chang
Attorney, Agent, or Firm—E. Philip Koltos

[57] ABSTRACT

A computer vision system and image processing method is provided for accurately determining the size and shape of coarsely textured, irregular and layered pieces of ore and the like. The system comprises a camera for producing an image of the ore, a digitizer for digitizing the camera image, and a video processor for processing the digitized image. An optional digital computer may be employed for controlling the overall system and for determining the dimensions, mass, and surface area of each piece of ore based on the processed image. The digitizer breaks down the camera image into a plurality of pixels and a set of line-spin masks, each including a line of negative unit or center weighted values and a central positive value equal to the absolute value of the negative values and each with the line disposed in a different orientation, are multiplied by the digital values of each of the pixels to determine new values for the pixels. A pixel field made up of lowest pixel values is used to determine particle sizes and shapes.

26 Claims, 1 Drawing Sheet

APPARATUS AND METHOD FOR COMPUTER VISION MEASUREMENTS

FIELD OF THE INVENTION

This invention relates generally to computer vision systems and image processing methods used therein and, more specifically, to an improved system and method for interpreting coarsely textured surfaces and coarsely textured, irregular and layered particles such as pieces of ore conveyed by a conveyor.

BACKGROUND OF THE INVENTION

Numerous mining and mineral processing activities require adjustments that are or could be based on visual observations or physical sampling of the particle size or size distribution of the ores involved. For example, mine blasting parameters can be adjusted using a size measurement of the feed into a primary crusher. Further, crusher settings can be controlled by measurement of the crusher discharge and autogenous mill loading can be optimized by measurement of the mill feed. In addition, an agglomeration circuit may be controlled by measurement of the pellet product, recycled undersize, or material in a pelletizing drum.

One principal prior art method for providing size distribution measurements involves using an automated or manual sampling procedure. Analyzing a physical sample is often not practical in the settings referred to above since the samples must be taken to a laboratory for screen sieve analysis to determine the size of the particles in the sample. Further, even automated procedures (e.g., wherein a robotic arm is used to take the samples) do not overcome the basic difficulty of obtaining a sample because of the inaccessibility or size of the ore (e.g., in situations where trains dump mine run ore containing pieces weighing in excess of a ton).

Personal visual observation is a second principal method of determining particle size and size distribution, and has advantages and disadvantages. In this regard, while advantages of visual observation include speed, non-obtrusiveness, and the ability to make determinations with respect to many different parameters, these advantages are outweighed in the many applications by subjective nature of the observation, the possibility of human error, the missing of events due to lack of vigilance, and the limited response time of a human observer.

Recent advances in digital computers, in combination with television technology, have enabled human vision to be mimicked by digital computers. Existing computer vision systems are typically based on interpretations of one dimensional pictures such as that provided by a single line scan. This reliance on one dimensional pictures creates problems with incorrectly interpreting coarsely textured, irregular shaped and layered pieces or particles of ore. A discussion of the use of computer vision systems in determining the sizes of ore particles traveling along a conveyor belt or the like is provided in Grannes et al., "Development of a Digital Image Based On-Line Product Size Sensor for Taconite Mining" Tenth WVU International Mining Electrotechnology Conf., pp. 102–109 (July 1990).

A number of patents disclose the use of digital computers to interpret surface information gathered by a camera. Some of these patents, e.g., U.S. Pat. Nos. 4,660,086 (Lemelson) and 5,023,714 (Lemelson), disclose automatic scanning apparatus and methods for inspecting images. The apparatus comprises a camera which outputs an image signal of a viewed object to a computer. The computer then compares the shape of the scanned object with that of the images stored in memory in order to identify the object.

U.S. Pat. No. 4,916,640 (Gasperi et al ) discloses a video image processing system which evaluates characteristics of an object within a video image. The processing system comprises two cameras for recording images, a programmable controller for receiving the images from the cameras and for determining whether parameters from the picture fall within a given tolerance range, and a programming terminal for providing commands to the programmable controller.

U.S. Pat. No. 4,377,340 (Green et al) discloses a method and apparatus for detecting impurities on the surface of a semiconductor wafer. The apparatus comprises a collimated light source, a camera and an image processor. In operation, the collimated light is directed upon the wafer and the camera receives the scattered light from the surface of the wafer. The intensity of the received light is compared with a calibrated model to determine the size of a particle located on the wafer.

U.S. Pat. No. 4,121,294 (Galanis et al.) discloses an electro-optical gaging system comprising a camera, a digital computer for receiving and processing images from the camera, and a control system which receives commands from the computer for controlling the shape of a hot metallic bar.

SUMMARY OF THE INVENTION

In accordance with the invention, a computer vision system and image processing method are provided for accurately determining the shapes and size distribution of coarsely textured, irregular and layered pieces of ore and the like.

In accordance with one aspect of the invention, a computer vision system is provided for automatically determining the size distribution of particles of bulk materials such as pieces of ore carried by a conveyor, wherein the system comprises: scanning means for producing an analog representation of the particles; digitizing means for converting the analog representation into a digital representation of the particles comprising a pixel field wherein assigned digital values of the pixels represent the light intensities of the corresponding pixels; and processing means for processing the digital representation and producing a corresponding processed representation of the particles, the processing means including means for multiplying the digital values of the pixels of said digital representation by each mask of a set of line-spin masks, each of the masks comprising lines (rows) of weighting factors including a plurality of zero values and one line comprising a plurality of negative unit or center weighted negative values and a central positive value or group of values equal to the absolute magnitude of the sum of the negative values, and the spin-masks of a set differing in the angular orientation of said one line.

The scanning means advantageously comprises an interline frame transfer charged coupled device and the digitizing means advantageously comprises an analog to digital circuit and a memory for storing the output of the analog to digital circuit. In one embodiment, the line-spin masks comprise more than one pixel with a positive value and function as averaging filters. In a preferred embodiment, the processing means further comprises a noise reduction mask.

A digital computer is preferably provided for comparing the processed representation with preselected parameters and for generating an error signal when the processed representation does not satisfy or is inconsistent with the preselected parameters. The digital computer advantageously stores the processed representation on a magnetic media and displays the processed representation on a cathode ray tube.

The system can additionally comprise a control system for receiving said error signal and for controlling predetermined parameters associated with the system operation or the particles.

According to a further aspect of the invention, a method is provided for determining the shapes of coarsely textured, irregular and layered elements, the method including the steps of: forming an electronic image of the elements comprising a two-dimensional field of pixels wherein values are assigned to the pixels of the electronic image based on the brightness level of each pixel; and using a set of line-spin masks to provide masking of the pixels in sequence. Each of the line spin-mask includes lines of weighting factors including a plurality of zero values and one line comprising a plurality of negative values and a central positive value, or a group of central positive values, equal in magnitude to the absolute magnitude of the sum of the negative values of said one line. The set of masks preferably comprises four masks wherein the one line has a different directional orientation from the one line of the other masks. The masking step comprises the steps of: (i) aligning the center of a line-spin mask of the set with the selected pixel in the masking step for that pixel, (ii) multiplying the value of each pixel covered by the mask when the center of the mask is aligned with the selected pixel times the overlying value of the mask; (iii) summing the values of the pixels produced by the multiplication step; (iv) repeating steps (i), (ii) and (iii) for each mask of the set; and (v) comparing the values produced by the summing step for each mask and assigning the lowest value to the selected pixel. The method further comprises repeating steps (i) to (v) for each pixel and then using the digitized image produced when all of the pixels are assigned lowest values to determine the shapes of the elements.

In a preferred embodiment, the pixel field is a 512×512 field and each pixel is assigned an initial value representing the brightness of the pixel of between 0 and 255.

Advantageously, the method comprises the additional step of multiplying the pixel elements by a noise reduction mask. In a further embodiment, the method comprises the additional step of performing a chain code routine to determine the surface area and geometry or shape of the objects.

Other features and advantages of the invention will be set forth in, or apparent from, the following detailed description of preferred embodiments of the invention.

DESCRIPTION OF THE PREFERRED EMBODIMENTS

Figure 1:
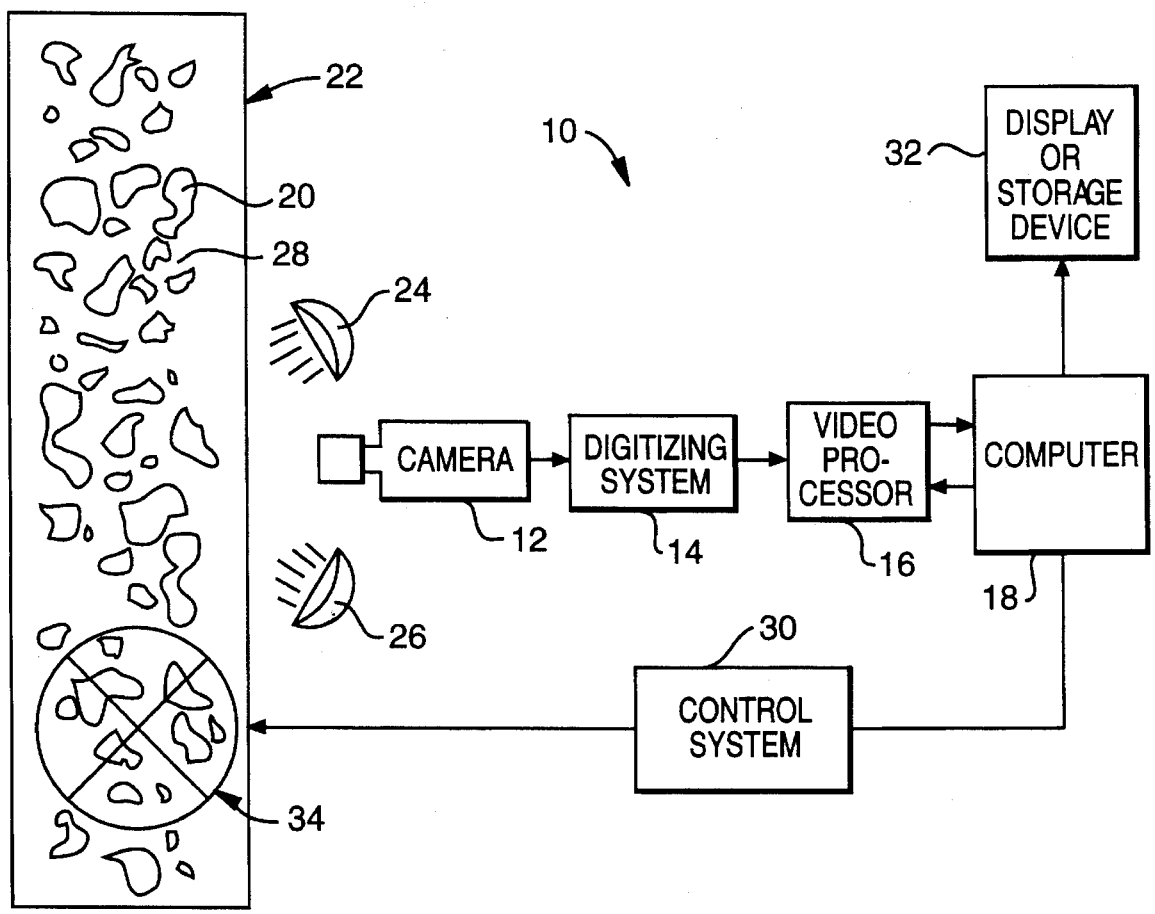
FIG. 1 is a block diagram of a computer vision system in accordance with a preferred embodiment of the invention.

Referring FIG. 1, there is illustrated a computer vision system which generally denoted 10 comprises an electronic shutter video camera 12, a digitizing system 14, a video processor or processor board 16 and a digital computer 18.

The camera 12 preferably comprise a solid state interline frame transfer charged coupled device (CCD) and, in an exemplary embodiment, comprises a RS-170 black and white camera or a video tape player having an 8 bit resolution on a 512×512 pixel field. The camera 12 provides images of coarsely textured, irregularly shaped, layered ore particles 20 on a conveyor belt or bed 22 which is illuminated by lamps 24 and 26. Lamps 24 and 26 are necessary to provide proper illumination of ore particles 20 and the wattage of the lamps 24 and 26 is determined by the F-stop of camera 12. The camera 12 produces a two dimensional (x and y planes) electronic image of the ore particles 20 and this image is transferred to digitizing system 14.

Figure 2:
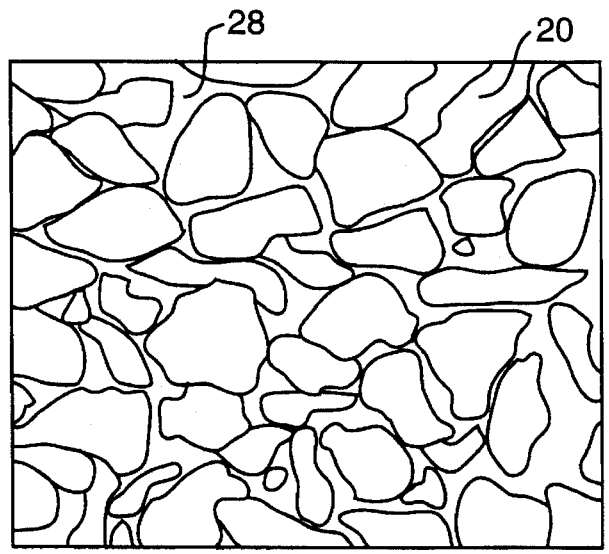
FIG. 2 is a black and white digitized image created by the computer vision system of FIG. 1.

Digitizing system 14, after receiving the image from the camera 12, digitizes each pixel in the 512×512 pixel field by assigning a value to the pixel of between 0 and 255 in accordance with the brightness of each particular pixel. FIG. 2 illustrates a black and white digitized image of ore particles 20 on conveyor 22. The digitizing system 14 preferably comprises a Mattrox Image Series, Image-1280 or Image-640 digitizer. The Mattrox Image Series digitizer is a double slot card which is mounted within computer 18 and is compatible with the EISA or AT bus. The Mattrox Image Series card includes a real-time processing board 16 which allows individual pixel values to be modified using both arithmetic and logical functions.

Video processing board 16 acts on the image stored in the digital memory 14 to convert the complex textured image of particles 20 into a black and white representation corresponding to particles 20 and void spaces 28, respectively, by multiplying the pixels of the image by a mask as described below.

In order to better understand the image processing masking techniques employed in accordance with the invention, it is helpful to consider prior art masking approaches. Attempts have been made to use prior art masks, such as threshold or edge detecting masks in determining the outlines of particles corresponding to the particles 20 but the use of such masks has not overcome the problems presented by the images to be processed. In this regard, it is difficult to in determine the actual shape and extent of individual pieces or particles because the shading and texture of the surfaces of the pieces are similar in appearance to the edges of the pieces. Further, many of the particles are obscured by other particles, and, in some cases, individual particles seem to blur together.

The prior art threshold masking method referred to above involves picking a digital light intensity value which corresponds to that of the particles. The shape of the particles can be approximately defined by the fact that the spaces or voids between the particles are dark, and that the particles tend to be brighter at their respective centers. Even though the light intensity generally increases towards the center of each particle, it is not possible to find a light level that correctly defines the center intensity of all of the particles in a situation such as illustrated in FIG. 1 because of the variations in contrast. Thus, picking a too high threshold will cause particles to be cut apart and interpreted as many small pieces. On the other hand, picking a too low threshold will cause individual separate particles to blur together and be interpreted as a single large particle.

The first derivative edge masking method of the prior art overcomes the problem of variations in light levels encountered in prior art threshold masking methods by utilizing the sharpness of the light contrast. Although this method correctly interprets distinct edges of the particles in many cases, one problem with this method is that the contrast variations caused by particle texture are often of greater magnitude than the actual edges of the particle. Thus, a particle or piece having a coarsely textured surface can be interpreted as being several particles.

Referring again to the present invention, the video processor 16 of the invention determines the outline of the particles 20 by utilizing what are referred to herein as "line-spin" masks. An example of a set of four 3×3 masks is illustrated below:

```
0 -1  0      0  0 -1      0  0  0     -1  0  0
0  2  0      0  2  0     -1  2 -1      0  2  0
0 -1  0     -1  0  0      0  0  0      0  0 -1
```

It will be noted that the second mask is produced by rotating the first (leftmost) mask through 45°, while the third mask is the second mask rotated through a further 45° and the fourth (rightmost) mask is the third mask rotated through a further 45°. Stated differently, the non-zero lines of the respective masks are arranged or oriented, taking the smallest positive angles, at 90° (270°), 45° (225°), 0° (180°) and 135° (−45° or 315°).

A line-spin mask is a unique set of weighting factors including of a line of negative weighting factors with a central positive value or group of values equal in absolute magnitude to the sum of the negative units. For example, a 9×9 mask can look like either of the following representations:

```
 0  0  0 0 0 0  0  0  0      0  0  0  0 0  0  0  0  0
 0  0  0 0 0 0  0  0  0      0  0  0  0 0  0  0  0  0
 0  0  0 0 0 0  0  0  0      0  0  0  0 0  0  0  0  0
 0  0  0 1 1 1  0  0  0      0  0  0  0 5  0  0  0  0
-1 -2 -2 1 2 1 -2 -2 -1     -1 -1 -2 -4 6 -4 -2 -1 -1
 0  0  0 1 1 1  0  0  0      0  0  0  0 5  0  0  0  0
 0  0  0 0 0 0  0  0  0      0  0  0  0 0  0  0  0  0
 0  0  0 0 0 0  0  0  0      0  0  0  0 0  0  0  0  0
 0  0  0 0 0 0  0  0  0      0  0  0  0 0  0  0  0  0
```

As illustrated, in the first (lefthand) mask all of the positive values are equal and are equal to absolute magnitude of the sum of the weighting factors. In the second (righthand) mask, the positive values are not equal but their sum is again equal to the absolute magnitude of the sum of the negative weighting factors. In both of these masks an "averaging filter" is provided, an averaging filter being created by providing more than one pixel with a positive value. It will, of course, be appreciated that a full set of four masks for each example would be produced by rotating the illustrated mask through 45°, 90° and 135°.

The line-spin masking method of the invention can be conceptually thought of as categorizing voids and particles based on a relative image convexity. Line-spin masking identifies voids and particles using the natural mechanism of light diffusivity. Particles reflect more light from their centers, which are incident to the light source, and less light from non-incident edges. Thus, an intensity inflection occurs in the edge transition region of each particle and this intensity inflection is independent of slope, magnitude or absolute brightness. In using a line-spin mask, the minimum second derivative, i.e., intensity inflection, of the four negative direction lines is assigned to the respective pixels and thus the shape of particles such as particles 20 of FIG. 1 can be accurately determined.

The nature of the line-spin masks themselves can be perhaps better understood by considering a concrete example and, as noted above, the set of four masks consists of the same line (−1, 2, −1, the first example above) oriented at 90°, 45°, 0° and 135° as shown above. Further, as was also noted above, the central positive value (2 in the first example) is equal to the absolute value of the sum of the negative units (| (−1)+(−1)| =2). It will be appreciated that any N×N mask may be created using this criteria and thus, for example, a 5×5 line-spin mask orientated at 90° can be represented as shown below.

```
0  0 -1  0  0
0  0 -2  0  0
0  0  6  0  0
0  0 -2  0  0
0  0 -1  0  0
```

It should be noted that in order to generate a full set of four 5×5 masks, the above mask must be rotated by 45°, 90°, and 135°, respectively, as in the first example. For ease of description, only the 3×3 mask will be specifically considered in the discussion which follows.

Considering the operation of the system of FIG. 1, a video image is digitized into pixels that are stored in the digitizing system 14 which assigns a value of 0–255 to each pixel. Next, a line-spin mask, such as that of the first example above is utilized in a multiplication and summation process, wherein the positive value in the line-spin mask (the value "2" in the mask of the first example) corresponds to the center pixel of the particle to generate a weighted pixel value. This multiplication and summation process is carried out three more times, using the other three masks of the first example, respectively to create respective weighted sets of pixels. Finally, the value for each pixel is checked in each weighted set and the lowest value is assigned to the pixel. For example, let us assume a section of a 512×512 digitized pixel field as illustrated at the left below and a set of 3×3 masks as discussed above, with the first mask as represented at the right below:

```
10  18  14  10   8...0     -1   0
16  22  20  12   6...0      2   0
14  20  14   8   4...0     -1   0
10  14   8   4   2...
 8  10   6   2   0...
 .   .   .   .   .
 .   .   .   .   .
 .   .   .   .   .
```

In this example, the mask is positioned so that the center value 2 is over the first pixel, i.e., the pixel having the value 10 at one corner of the field. Because this pixel is at a corner, the 3×3 mask will overlie only part of the field, viz., the upper corner including the pixels 10 and 18 in the top row and the pixels having the values 16 and 22 in the next row which will be covered by the values. It is noted that the fact that all of the mask does not cover pixels of the digitizing pixel field is acceptable since there is an intrinsic error associated with interpreting the edge of the 512×512 digitized pixel field. The first mathematical operation which that carried out is to multiply each pixel covered by the mask with the overlying value of the mask. In the above example this will result in the following:

```
  20        0 ...
 -16        0 ...
   .        .
   .        .
   .        .
```

The next step is to sum all of the values generated by the multiplication process. In the above example, this would result in summing 20 with −16 and the two O's, thus yielding a net value of 4. This value is temporarily stored in memory while the above process is repeated for each of the other three 3×3 masks described previously. In the above example, the other three values which will be stored will be 20, 2 and −2 for the respective masks. Next, the lowest value is assigned to the pixel location in the 512×512 digitized pixel field. Thus, in the above example, the value of 10 will be replaced with −2 in a 512×512 memory array which represents the minimum second derivative, i.e., intensity inflection. This process is repeated for each pixel in the 512×512 digitized pixel field.

In interpreting the resultant pixel field, convex areas, i.e., memory array values less than zero are interpreted as voids and concave areas, i.e., memory array values greater than zero are interpreted as particles.

One important advantage of using four directional line masks, as versus a single non-directional mask, is in regions where individual particles touch. In these regions, which are generally called saddle regions, the pixels are correctly interpreted as void spaces using a set of directional masks since the minimum mask result, i.e., that providing the greatest convexity, is selected for each pixel. In contrast, a non-directional mask will average the concavity and convexity of the region and thus cause one to misinterpret the shape of the region.

The information produced by the masking operation described above is then processed by digital computer 18. It should be noted that the size of the mask utilized will depend on the size of the particles 20, i.e., the mask should have an overall dimension large enough that when the mask is centered upon the pixels representing a large particle 20, one-third of the pixels are covered by the mask. The higher negative center weighting values enhance sensitivity to smaller particles thus increasing the size measurement range.

As noted above, in an alternative embodiment, an averaging filter can be incorporated in the line-spin mask. Examples of averaging filters are the 9×9 masks illustrated and discussed previously. Such a mask improves the interpretation of pieces which are larger than the averaging filter size. The smallest line spin mask in which an averaging filter can be included is a 5×5 mask. As noted above, an averaging filter is created by providing more than one pixel with a positive value. It should also be noted that the above examples are merely illustrative since there are many different masks that can be used for the purposes of the invention.

Computer 18 may house the digitizing system 14 and the video processor 16. Computer 18 can be a conventional computer which utilizes an Intel 80486 micro-processor. The computer 18 will operate in a MS-DOS environment and will execute "C" program modules to actually digitize the images generated by camera 12 and process the images.

Computer 18 is further used to carry out conventional noise reduction and outline tracing routines such as chain code methods for determining surface areas, maximum and minimum dimensions, and for categorizing both the mass and size of particles 20 in a sample according to observed measurements in the x and y planes. Computer 18 can also be used as a controller to provide feedback to a control system 30 and can also transmit the above information to a display and storage device 32 for display or storage.

Control system 30 can receive commands from computer 18 to control the characteristics of particles 20, such as size, so that the numerous mining and mineral processing activities which require adjustments based on visual observations may be carried out. For example, mine blasting parameters can be adjusted by measurement of the feed into a primary crusher 34; crusher settings may be controlled by measurement of the crusher discharge; autogenous mill loading may be optimized by measurement of the mill feed; and an agglomeration circuit may be controlled by measurement of the pellet product, recycled undersize, or material in a pelletizing drum.

The display and storage device 32 is used for either displaying, and or permanently maintaining a record of, the dimensions, mass and size of particles 20 which are sampled. In a preferred embodiment, a display device would be provided in the form of a computer monitor and a storage device in the form of a magnetic or optical media.

Although the present invention has been described to specific exemplary embodiments thereof, it will be understood by those skilled in the art that variations and modifications can be effected in these exemplary embodiments without departing from the scope and spirit of the invention. For example, an optical or analog electronic system can be used to duplicate the line-spin masks described above. Further, the size of the line-spin masks can be modified as described above. It should also be noted that the invention has many applications and for example, may be used for measurements of crushed stone, sand, gravel or minerals, grading of the shapes of commodities such as lumber, grading of meat products, inspection of manufactured products, and enhancing images.

What is claimed is:

1. A computer vision system for automatically determining the size and size distribution of particles of bulk materials, said system comprising:

scanning means for producing an analog representation of said particles;

digitizing means for converting said analog representation into a digital representation of said particles comprising a pixel field wherein initial assigned digital values of the pixels represent the light intensities of the corresponding pixels; and processing means for processing said digital representation and producing a processed representation of said particles, said processing means including means for multiplying the digital values of the pixels of said digital representation by each mask of a set of line-spin masks, each of the masks comprising lines of weighting factors including a plurality of zero values and one line comprising a plurality of negative values and a central group of more than one positive value, the magnitude of the sum of the values of said group being equal to the absolute magnitude of the sum of the negative values, the line-spin masks of said set differing in the angular orientation of said one line, and said one line being the only line of said mask containing all non-zero values, and said processing means including means for further performing, for each line-spin mask of said set, a summation of the multiplied values produced by said multiplying of the digital values of the pixels of said digital representation by each mask of said set, and for assigning the lowest resulting value of said summation to a pixel of interest.

2. The system recited in claim 1 wherein said scanning means comprises an interline frame transfer charged coupled device.

3. The system recited in claim 1 wherein said digitizing means comprises an analog to digital circuit and a memory for storing the output of said analog to digital circuit.

4. The system recited in claim 1 wherein said processing means further comprises a noise reduction mask.

5. The system recited in claim 1 further comprising a digital computer for comparing said processed representation with preselected parameters and for generating an error signal when said processed representation does not satisfy said preselected parameters.

6. The system recited in claim 5 wherein said digital computer stores said processed representation on a magnetic media.

7. The system recited in claim 5 wherein said digital computer displays said processed representation on a cathode ray tube.

8. The system recited in claim 5 further comprising a control system for receiving said error signal and for controlling parameters of subsequent particles.

9. The system recited in claim 5 wherein said digital computer displays said processed representation on a cathode ray tube.

10. The system recited in claim 1, wherein said central positive group of values comprises values centered around said one line and which, within said set, differ in angular orientation.

11. A method for determining the shapes of coarsely textured, irregular and layered elements, said method comprising the steps of:

(a) forming an electronic image of the elements comprising a two-dimensional field of pixels wherein values are assigned to the pixels of the electronic image based on the brightness level of each pixel;

(b) using a set of line-spin masks to provide masking of said pixels in sequence, each line-spin mask including a plurality of zero values and one line comprising a plurality of negative values and a central group of positive values, equal in magnitude to the sum of the negative values of said one line, said one line being the only line of said mask containing all non-zero values, the set of masks comprising four masks wherein the one line has a different directional orientation from the one line of the other masks, and said masking step comprising the steps of:

(i) aligning the center of a line-spin mask of a set of line-spin masks with a selected pixel in the masking step for that pixel;

(ii) multiplying the value of each pixel covered by the mask when the center of the mask is aligned with the selected pixel times the overlying value of the mask;

(iii) summing the values of the pixels produced by the multiplication step;

(iv) repeating steps (i), (ii) and (iii) for each mask of the set; and (v) comparing the values produced by the summing step for each mask and assigning the lowest value to the selected pixel;

(c) repeating steps (i) to (v) for each pixel; and (d) using the digitized image produced when all of the pixels are assigned lowest values to determine the shapes of the elements by assigning pixels having values less than a predetermined value to be spaces and pixels having values greater than or equal to a predetermined value to be elements.

12. The method according to claim 11 comprising the additional step of performing a chain code routine to determine the surface area and geometry of the objects.

13. The method according to claim 12, wherein said pixel field is a 512×512 field and the step of assigning each pixel of the pixel field an initial value comprises assigning a value representing the brightness of the pixel of between 0 and 255.

14. The method according to claim 11 comprising the additional step of multiplying the pixel elements by a noise reduction mask.

15. The method according to claim 11, wherein said predetermined value is zero.

16. The method according to claim 11, further comprising the step of tracing edges of particles in said digitized image by following the definition elements and spaces.

17. The method according to claim 11, further comprising repeating steps (b)–(c) using different sets of line-spin masks corresponding to different element sizes and step (d) further comprises, before assigning the pixels, summing the assigned lowest values of the pixels for each different set of line-spin masks.

18. A computer vision system for automatically determining the size and size distribution of particles of bulk materials, said system comprising:

scanning means for producing an analog representation of said particles;

digitizing means for converting said analog representation into a digital representation of said particles comprising a pixel field wherein initial assigned digital values of the pixels represent the light intensities of the corresponding pixels; and processing means for processing said digital representation and producing a processed representation of said particles, said processing means including means for multiplying the digital values of the pixels of said digital representation by each mask of a set of line-spin masks, each of the masks comprising lines of weighting factors including a plurality of zero values and one line comprising a plurality of values having a first sign and a central value having a second sign opposite said first sign, said central value being equal to the absolute magnitude of the sum of the values of said first sign, and the spin-masks of a set differing in the angular orientation of said one line, said one line being the only line of said mask containing all non-zero values, and the size of said one line being dependent upon a particle size of interest, said processing means including means for further performing, for each line-spin mask of said set, a summation of the multiplied values produced by said multiplying of the digital values of the pixels of said digital representation by each mask of said set, and for assigning the lowest resulting value of said summation to a pixel of interest.

19. The computer vision system recited in claim 18, each mask for each particle size of interest having all of the values of said first sign equal to one.

20. The computer vision system recited in claim 18, wherein a mask for a particle size of interest covers one-third of the particle size of interest when centered on the particle size of interest.

21. The computer vision system as recited in claim 18, wherein said line spin masks further comprise a plurality of values of said second sign centered around said central value.

22. The system recited in claim 18 wherein said processing means further comprises a noise reduction mask.

23. The system recited in claim 18 further comprising a digital computer for comparing said processed representation with preselected parameters and for generating an error signal when said processed representation does not satisfy said preselected parameters.

24. The system recited in claim 18 wherein said digital computer stores said processed representation on a magnetic media.

25. The system recited in claim 18 comprising a control system for receiving said error signal and for controlling parameters of subsequent particles.

26. A computer vision system for automatically determining the size and size distribution of particles of bulk materials, said system comprising:

scanning means for producing an analog representation of said particles;

digitizing means for converting said analog representation into a digital representation of said particles comprising a pixel field wherein initial assigned digital values of the pixels represent the light intensities of the corresponding pixels;

processing means for processing said digital representation and producing a processed representation of said particles, said processing means including means for multiplying the digital values of the pixels of said digital representation by each mask of a set of line-spin masks, each of the masks comprising lines of weighting factors including a plurality of zero values and one line comprising a plurality of negative values and a central group of more than one positive value, the magnitude of the sum of the values of said group being equal to the absolute magnitude of the sum of the negative values, the spin-masks of said set differing in the angular orientation of said one line, and said one line being the only line of said mask containing all non-zero values, and said processing means further including means for further performing, for each line-spin mask of said set, a summation of the multiplied values produced by said multiplying of the digital values of the pixels of said digital representation by each mask of said set, and for assigning the lowest resulting value of said summation to a pixel of interest;

a digital computer for comparing said processed representation with preselected parameters and for generating an error signal when said processed representation does not satisfy said preselected parameters; and a control system for receiving said error signal and for controlling parameters of subsequent particles.

\* \* \* \* \*